(12) United States Patent
Wright et al.

(10) Patent No.: US 12,328,398 B2
(45) Date of Patent: Jun. 10, 2025

(54) METHOD OF USING A BLOCKCHAIN

(71) Applicant: nChain Licensing AG, Zug (CH)

(72) Inventors: Craig Steven Wright, London (GB); Owen Vaughan, London (GB); Brock Doiron, London (GB)

(73) Assignee: nChain Licensing AG, Zug (CH)

( * ) Notice: Subject to any disclaimer, the term of this patent is extended or adjusted under 35 U.S.C. 154(b) by 494 days.

(21) Appl. No.: 17/435,619

(22) PCT Filed: Mar. 4, 2020

(86) PCT No.: PCT/IB2020/051825
§ 371 (c)(1),
(2) Date: Sep. 1, 2021

(87) PCT Pub. No.: WO2020/178752
PCT Pub. Date: Sep. 10, 2020

(65) Prior Publication Data
US 2022/0148111 A1    May 12, 2022

(30) Foreign Application Priority Data

Mar. 4, 2019   (GB) ..................................... 1902908
May 28, 2019  (GB) ..................................... 1907499

(51) Int. Cl.
*H04L 9/32*    (2006.01)
*G06Q 50/18*   (2012.01)
(Continued)

(52) U.S. Cl.
CPC ........... *H04L 9/3247* (2013.01); *G06Q 50/18* (2013.01); *H04N 7/147* (2013.01);
(Continued)

(58) Field of Classification Search
CPC ....... H04L 9/3247; G06Q 50/18; H04N 7/147
See application file for complete search history.

(56) References Cited

U.S. PATENT DOCUMENTS 10,671,712 B1 *  6/2020  Lindley ................. H04L 9/3247
11,170,092 B1 * 11/2021  Liang ................... H04L 9/0637
(Continued)

FOREIGN PATENT DOCUMENTS

EP    3413507        12/2018
JP    2009027543 A    2/2009
(Continued)

OTHER PUBLICATIONS

Chowdhury, M.J.M.; Colman, A.; Kabir, M.A.; Han, J; Sarda, P.; "Blockchain as a Notarization Service for Data Sharing with Personal Data Store," 17th Int'l Conf on Trust, Security & Privacy In Computing And Communications/12th Int'l Conf on Big Data Science & Engineering, IEEE, New York, NY, 2018, pp. 1330-1335.*

(Continued)

*Primary Examiner* — Victor Lesniewski
(74) *Attorney, Agent, or Firm* — Messner Reeves LLP

(57) ABSTRACT

A second party receives confirmation that a first party agrees to a statement. The second party receives a piece of information after said confirmation and after a cryptographic signature of the first party. To attest to this, the second party generates their own cryptographic signature by signing a portion of data comprising said piece of information or a transformation thereof. A network of nodes is then sent one or more transactions comprising the first and second signatures. Transactions are propagated across the network to be recorded in a blockchain on condition of meeting a validation condition. The validation condition for one of the one or more transactions is that the first signature is included in one of the one or more transactions, the second signature is included in one of the one or more transactions, and the second signature was generated by signing the particular portion of data.

20 Claims, 9 Drawing Sheets

(51) Int. Cl.
*H04N 7/14* (2006.01)
*H04L 9/00* (2022.01)

(52) U.S. Cl.
CPC ........ *G06Q 2220/00* (2013.01); *H04L 9/3239* (2013.01); *H04L 9/50* (2022.05)

(56) References Cited

U.S. PATENT DOCUMENTS

| | | | |
|---|---|---|---|
| 2018/0150835 A1 | 5/2018 | Hunt et al. | |
| 2018/0205555 A1 | 7/2018 | Watanabe et al. | |
| 2018/0248699 A1 | 8/2018 | Andrade | |
| 2019/0043043 A1* | 2/2019 | Saraniecki | G06F 16/1774 |
| 2019/0319948 A1* | 10/2019 | Triola | H04L 9/3247 |
| 2019/0354724 A1* | 11/2019 | Lowagie | G06F 16/152 |
| 2019/0378127 A1* | 12/2019 | Dudar | H04L 9/0637 |
| 2020/0076612 A1* | 3/2020 | Adluri | H04L 9/3239 |
| 2020/0111087 A1* | 4/2020 | Zhou | H04L 9/3213 |
| 2020/0219097 A1 | 7/2020 | Chan et al. | |
| 2020/0244470 A1* | 7/2020 | Ruckriemen | G06F 21/645 |
| 2020/0258176 A1* | 8/2020 | Gibson | G06F 21/32 |
| 2020/0267163 A1* | 8/2020 | Wilson | H04L 9/3271 |
| 2022/0191035 A1* | 6/2022 | Tucker | H04L 63/123 |
| 2024/0388457 A1* | 11/2024 | Gordon | H04L 9/0825 |

FOREIGN PATENT DOCUMENTS

| | | |
|---|---|---|
| WO | 2017010455 A1 | 1/2017 |
| WO | 2018176140 A1 | 10/2018 |
| WO | 2019034983 A1 | 2/2019 |
| WO | 2019034984 A1 | 2/2019 |

OTHER PUBLICATIONS

Transaction Verification Steps: OP_CHECKSIG (SIGHASH_ALL only), Bitcoin Wiki, Jan. 16, 2019, en.bitcoin.it/wiki/OP_CHECKSIG.

* cited by examiner

S1: Alice and Bob open up a video channel between them. This video is recorded.

S2: Alice creates a secret $H(X)$ known only to herself, and hashes that secret.

S3: Alice creates a $UTXO_1$ that can be redeemed by providing her signature, the preimage of $H(X)$, and Bob's signature. The locking script can be written schematically as:

Locking = [Checksig $P_A$] [Solve $H(X)$] [Checksig $P_B$] .

S4: Alice creates a partial transaction $Tx_1$ that spends $UTXO_1$. The electronic document may be included in the transaction, for example in an unspendable output (OP_RETURN).

Alice does not yet add her signature or the preimage of $H(X)$ to $Tx_1$.

S5: Alice sends the partial transaction $Tx_1$ to Bob.

Note: at this point Bob is not able to provide a valid signature for $Tx_1$ as he does not know the preimage of $H(X)$. This is because although Alice's signature is ignored when Bob constructs his signature, the preimage of the hash puzzle cannot be ignored.

S6: Bob asks Alice orally that she agrees to the terms of a deed. Alice confirms orally. (This is recorded on the video link).

S7: Alice provides a signature for $Tx_1$ and a solution to the hash puzzle $H(X)$. She sends this to Bob.

S8: Bob now knows $X$ and can provide a valid signature for $Tx_1$. Bob signs $Tx_1$.

S9: The video data, or hash of the data, may be stored in transaction $Tx_1$, for example in an OP_RETURN. This part of the output must not have been signed previously by Alice and Bob, which can be achieved using any SIGHASH flag other than SIGHASH_ALL.

This video data may be signed by either Alice, Bob or both using separate signatures to those in Steps S7 and S8.

S10: The transaction $Tx_1$ is now complete and can be sent to the network by either Alice or Bob, where it is recorded immutably on the blockchain.

| TxID$_0$ | |
|---|---|
| Input | Output |
|  | 0. $UTXO_1$<br>*Locking:*<br>[Checksig $P_A$] |

$Tx_1$

| TxID$_1$ | |
|---|---|
| Input | Output |
| 0. $UTXO_1$<br>*Unlocking:*<br>[Sig $P_A$] | 0. $UTXO_2$<br>*Locking:*<br>[Checksig $P_B$]<br><br>1. OP_RETURN<br>Document (or hash value) |

$Tx_2$

| TxID$_2$ | |
|---|---|
| Input | Output |
| 0. $UTXO_2$<br>*Unlocking:*<br>[Sig $P_B$] | 0.<br><br>1. OP_RETURN<br>Video Attestation<br>(or hash value) |

Alice creates and sends partial $Tx$ to Bob

| TxID$_1$ | |
|---|---|
| Input | Output |
|  | 0. $UTXO_2$<br>*Locking:*<br>[checksig $P_B$]<br>1. OP_RETURN<br>Document<br>Video Attestation<br>(or hash values) |

*Invalid*

T6

Alice signs the $Tx$ including the document

| TxID$_1$ | |
|---|---|
| Input | Output |
| 0. $UTXO_1$<br>*Unlocking:*<br>[sig $P_A$] | 0. $UTXO_2$<br>*Locking:*<br>[checksig $P_B$]<br>1. OP_RETURN<br>Document<br>Video Attestation<br>(or hash values) |

*Valid*

T7

Bob spends the output of Alice's transaction confirming that he witnessed her signature

| TxID$_2$ | |
|---|---|
| Input | Output |
| 0. $UTXO_2$<br>*Unlocking:*<br>[sig $P_B$] |  |

*Valid*

METHOD OF USING A BLOCKCHAIN

CROSS REFERENCE TO RELATED APPLICATIONS

This application is the U.S. National Stage of International Application No. PCT/IB2020/051825 filed on Mar. 4, 2020, which claims the benefit of United Kingdom Patent Application No. 1902908.1, filed on Mar. 4, 2019 and United Kingdom Patent Application No. 1907499.6, filed May 28, 2019, the contents of which are incorporated herein by reference in their entireties.

TECHNICAL FIELD

The present disclosure discloses a particular new tier-two application of a blockchain, i.e. secondary functionality added on top of a blockchain.

BACKGROUND

A blockchain refers to a chain of blocks of data, wherein a respective copy of the blockchain is maintained at each of a plurality of nodes in a peer-to-peer (P2P) network. At least some nodes may also act as miners, as explained shortly. Each block in the chain comprises one or more transactions, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction comprises at least one input and at least one output. Each output specifies an amount representing a quantity of a digital asset belonging to a user to whom the output is cryptographically locked (requiring a signature of that user in order to be unlocked and thereby redeemed or spent). Each input points back to the output of a preceding transaction, thereby linking the transactions.

In a given present transaction, the (or each) input comprises a pointer referencing the output of a preceding transaction in the sequence of transactions, specifying that this output is to be redeemed or "spent" in the present transaction. The input of the present transaction also comprises the signature of the user to whom the output of the preceding transaction is locked. In turn, the output of the present transaction can be cryptographically locked to a new user. The present transaction can thus transfer the amount defined in the input of the preceding transaction to the new user as defined in the output of the present transaction. In some cases a transaction may have multiple outputs to split the input amount between multiple users (one of whom could be the original user in order to give change). In some cases transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application to collate the values of all the UTXOs of that user which are scattered throughout many different transactions in the blockchain.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user wishes to enact a new transaction, then he/she sends the new transaction from his/her computer terminal to one of the nodes of the P2P network (which nowadays are typically servers or data centres, but could in principle be other user terminals). This node checks whether the transaction is valid according to a node protocol which is applied at each of the nodes. The details of the node protocol will correspond to the type of transaction protocol being used in the blockchain in question, together forming the overall transaction model. The node protocol typically requires the node to check that the cryptographic signature in the new transaction matches the expected signature, which depends on the previous transaction in an ordered sequence of transactions. In an output-based case, this may comprise checking that the cryptographic signature of the user included in the input of the new transaction matches a condition defined in the output of the preceding transaction which the new transaction spends, wherein this condition typically comprises at least checking that the cryptographic signature in the input of the new transaction unlocks the output of the previous transaction to which the input of the new transaction points. In some transaction protocols the condition may be at least partially defined by a custom script included in the input and/or output. Alternatively it could simply be a fixed by the node protocol alone, or it could be due to a combination of these. Either way, if the transaction is valid, the current node forwards the new transaction to one or more others of the nodes in the P2P network. At least some of these nodes also act as forwarding nodes, applying the same test according to the same node protocol, and so forward the new transaction on to one or more further nodes, and so forth. In this way the new transaction is propagated throughout the network of nodes.

In an output-based model, the definition of whether a given output (e.g. UTXO) is spent is whether it has yet been validly redeemed by the input of another, onward transaction according to the node protocol. Another condition for a transaction to be valid is that the output of the preceding transition which it attempts to spend or redeem has not already been spent/redeemed by another valid transaction. Again if not valid, the transaction will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes also race to be the first to create blocks of transactions in a process known as mining, which is underpinned by "proof of work". At a mining node, new transactions are added to a pool of valid transactions that have not yet appeared in a block. The miners then race to assemble a new valid block of transactions from the pool of transactions by attempting to solve a cryptographic puzzle. Typically this comprises searching for a "nonce" value such that when the nonce is concatenated with the pool of transactions and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node that is trying to solve the puzzle.

The first miner node to solve the puzzle announces this to the network, providing the solution as proof which can then be easily checked by the other nodes in the network (once given the solution to a hash it is straightforward to check that it causes the output of the hash to meet the condition). The pool of transactions for which the winner solved the puzzle then becomes recorded as a new block in the blockchain by at least some of the nodes acting as storage nodes, based on having checked the winner's announced solution at each node. A block pointer is also assigned to the new block pointing back to the previously created block in the chain. The proof-of-work helps reduce the risk of double spending since it takes a large amount of effort to create a new block, and any block containing a double spend is likely to be rejected by other nodes, so mining nodes are incentivised not to allow double spends to be included in their blocks. Once created, the block cannot be modified since it is recognized and maintained at each of the storing nodes in the P2P network according to the same protocol. The block pointer also imposes a sequential order to the blocks. Since the transactions are recorded in the ordered blocks at each storage node in a P2P network, this therefore provides an immutable public ledger of the transactions.

Note that different miners racing to solve the puzzle at any given time may be doing so based on different snapshots of the unmined transaction pool at any given time, depending on when they started searching for a solution. Whoever solves their respective puzzle first defines which transactions are included in the new block, and the current pool of unmined transactions is updated. The miners then continue to race to create a block from the newly defined outstanding pool, and so forth. A protocol also exists for resolving any "fork" that may arise, which is where two miners solve their puzzle within a very short time of one another such that a conflicting view of the blockchain gets propagated (in short, whichever prong of the fork grows the longest becomes the definitive chain).

In most blockchains the winning miner is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "coinbase" transaction. It automatically forms part of the new block. This reward gives an incentive for the miners to participate in the proof-of-work race. Often a transaction will also specify an additional transaction fee in one of its outputs, to further reward the winning miner that created the block in which that transaction was included.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. Assuming the transaction is validated and thereby accepted onto the blockchain, the additional user data will thus remain stored at each of the nodes in the P2P network as an immutable public record. For instance this may be used to store an electronic document in the blockchain. The fact that the transaction is cryptographically signed adds a certain degree of trust in the document, and therefore a certain degree of security is provided by the use of the blockchain as a means of storing a document, especially in conjunction with the fact that the blockchain provides an immutable public record.

SUMMARY

However, this only provides a certain degree of security. To add further security, it is recognized herein that it would be desirable to provide a mechanism to allow a second party to attest electronically to the fact that a first party has agreed to a document or such like (e.g. agreed to a statement or statements made in the content of the document). A technical challenge in this is to provide a mechanism which provides trust in the attestation. Particularly, in the case of a second party attesting to the fact that some statement or proposition has been agreed by a first party, it is recognized herein that it would be desirable to demonstrate computationally or cryptographically that the second party generated his/her cryptographic signature after the first party. It is further recognized herein that the role of node validation can be exploited in order to achieve this.

According to one aspect disclosed herein, there is provided a computer-implemented method of using a blockchain to evidence that a first party agrees to a statement. The method comprises the following steps performed at computer equipment of a second party. The second party receives confirmation that the first party agrees to the statement; the second party receives a piece of information of the first party that is unavailable to the second party until after said confirmation, and after the first party has generated a cryptographic signature of the first party to indicate said agreement in addition to said confirmation. To indicate that the second party attests to the receipt of said confirmation by the first party, the second party generates a cryptographic signature of the second party by signing a portion of data comprising said piece of information or a transformation thereof. One or more transactions are then sent to a network of nodes by the second party or another party using other equipment. The one or more transactions comprise the signature of the first party included in at least one of the one or more transactions and the signature of the second party included in at least one of the one or more transactions. The network is configured to propagate each transaction across the network to be recorded in a copy of the blockchain maintained at each of at least some of the nodes, but on condition of meeting a validation condition. The validation condition is configured to validate one of the one or more transactions on condition that: the signature of the first party is included in one of the one or more transactions, the signature of the second party is included in one of the one or more transactions, and the signature of the second party was generated by signing said portion of data.

Because the second party only receives the piece of information of the first party after the first party signs and confirms his/her consent, and because the signature of the second party is required to be generated by signing this piece of information, then this cryptographically evidences that the second party signed after the first party. Once the transactions have been propagated throughout the network then they remain in the blockchain (in the copy maintained at each storage node) as an immutable record of this evidence. However, if the condition is not met, the forwarding nodes will not validate the transaction and hence will not propagate it. This thus exploits the process of validation to evidence the order of the signatures, since only a transaction demonstrating the correct sequence of signatures will be propagated and recorded in blockchain.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 7 is a schematic flow chart showing the steps of the first method using the set of transactions illustrated in FIGS. 5 and 6, FIG. 8 schematically illustrates another set of example transactions for evidencing agreement to a document in a blockchain according to a second method, FIG. 9 schematically illustrates example details of some of the steps in the second method.

DETAILED DESCRIPTION OF EMBODIMENTS

Figure 1:
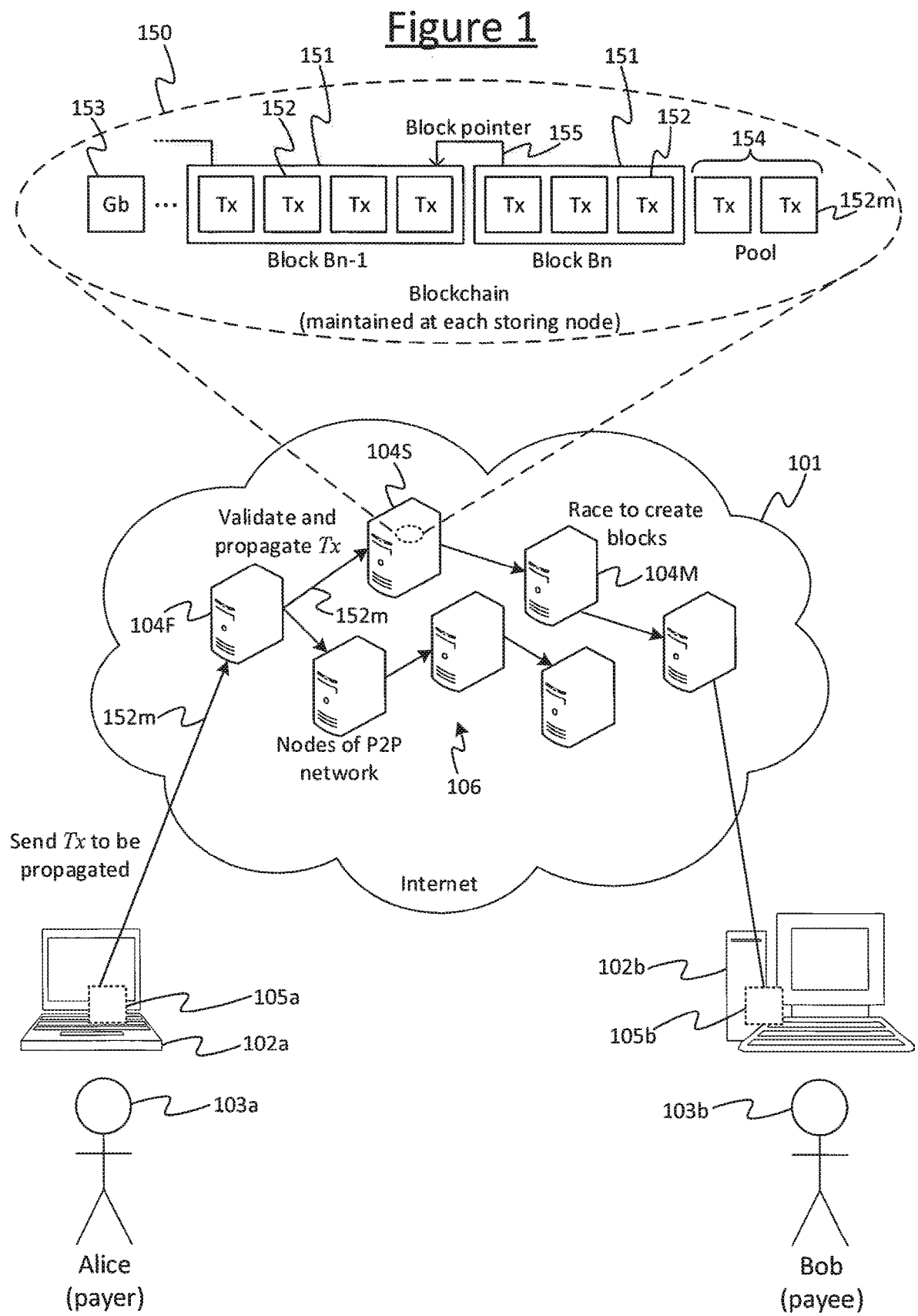
FIG. 1 is a schematic block diagram of a system for implementing a blockchain, FIG. 2 schematically illustrates some examples of transactions which may be recorded in a blockchain.

FIG. 1 shows an example system 100 for implementing a blockchain 150 generally. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. A given node 104 may be a forwarding node 104, miner 104M, storage node 104S or any combination of two or all of these.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could comprise a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service of any one particular entity.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, accelerator processors, application specific processors and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

The blockchain 150 comprises a chain of blocks 151. Each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152m to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152m, it handles it in accordance with the node protocol and its respective role. This comprises first checking whether the newly received transaction 152m meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152m passes the test for being deemed valid (i.e. on condition that it is "validated"), any storage node 104S that receives the transaction 152m will add the new validated transaction 152 to the pool 154 in the copy of the blockchain 150 maintained at that node 104S. Further, any forwarding node 104F that receives the transaction 152m will propagate the validated transaction 152 onward to one or more other nodes 104 in the P2P network 106. Since each forwarding node 104F applies the same protocol, then assuming the transaction 152m is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152m). Once the proof-of-work has been done for the pool 154 including the new transaction 152m, it immutably becomes part of one of the blocks 151 in the blockchain 150. Each transaction 152 comprises a pointer back to an earlier transaction, so the order of the transactions is also immutably recorded.

Figure 2:
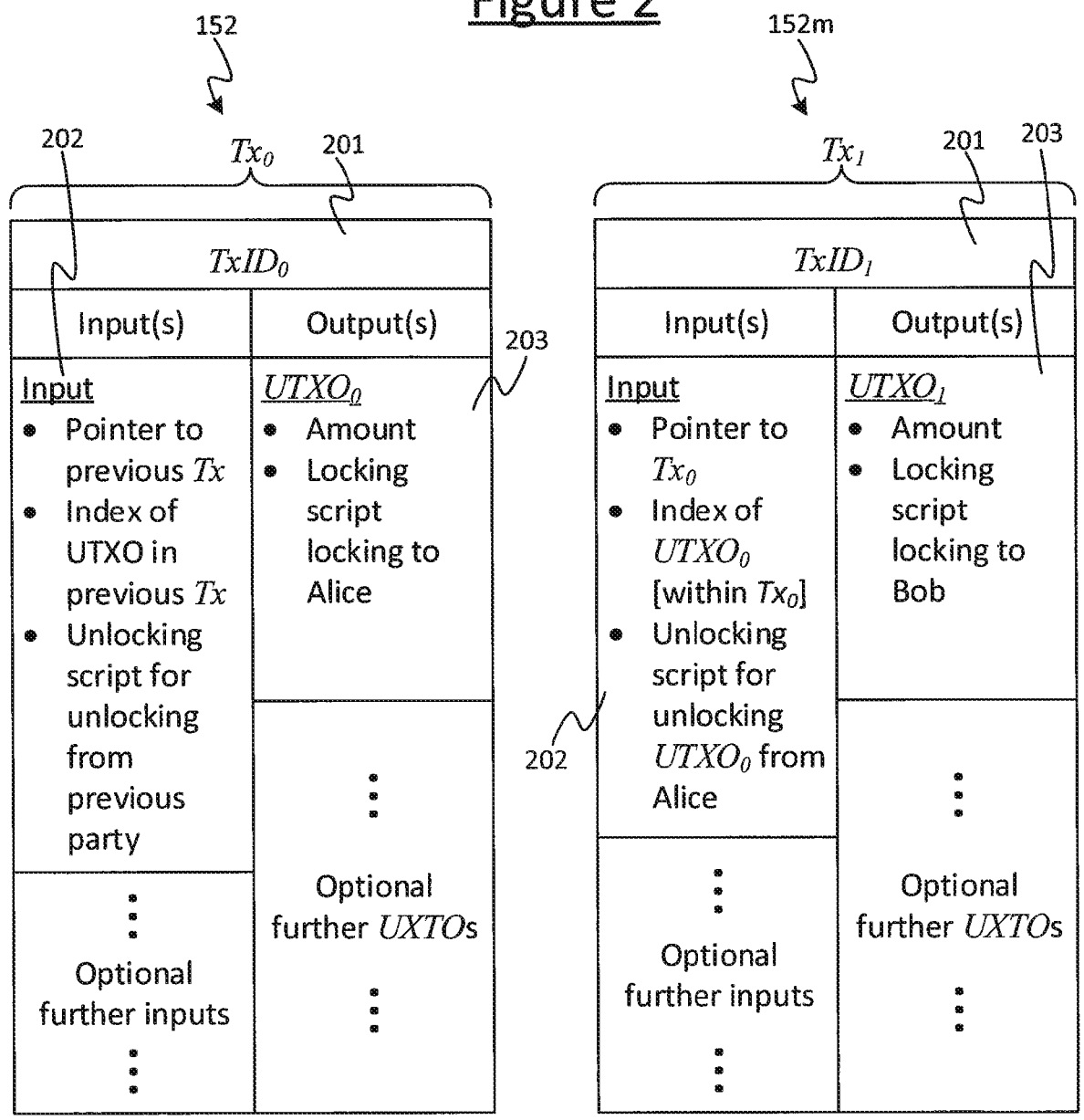

FIG. 2 illustrates an example transaction protocol. This is an example of an UTXO-based protocol. A transaction (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO contains the transaction ID of the transaction from which it came, amongst other information. The transaction data structure may also comprise a header 201, which may comprise an indicator of the size of the input field(s) 202 and output field(s) 203. The header 201 could also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction transferring an amount of the digital asset in question to Bob 103b. In FIG. 2 Alice's new transaction 152m is labelled "$Tx_1$". It takes an amount of the digital asset that is locked to Alice in the output 203 of a preceding transaction in the sequence, and transfers at least some of this to Bob. The preceding transaction is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). It does not necessarily imply an order in which they are created, sent to the network 106, or arrive at any given node 104. Nevertheless, a subsequent transaction (the "child") which points to a preceding transaction (the "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition that: the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$>||[Checksig $P_A$]

where "||" represents a concatenation and "< . . . >" means place the data on the stack, and "[ . . . ]" is a function comprised by the unlocking script (in this example a stack-based language), When run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a storage node 104S, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also need to include a fee for the winning miner, because nowadays the coinbase reward alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$ and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160 <H($P_a$)>OP_EQUALVERIFY OP_CHECKSIG. "OP_. . ." refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

Note: the locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

According to the present disclosure, the process of node validation is exploited to provide a secure mechanism whereby a second party 103a ("Bob") can attest to the fact that a first party 103a ("Alice") agrees to a document. In this scenario Alice is agreeing and Bob is attesting for the benefit of some other party. Agreeing to a document may mean agreeing to one, some or all of one or more statements made in the content of the document. The document may for example comprise a deed, affidavit or will. It may exist in paper, electronic or any other form. Alice will provide her cryptographic signature in association with the document, and then Bob will provide his cryptographic signature in association with the document to attest to Alice's agreement to the document. The signatures are included in one or more transactions 152 in the blockchain 150 as evidence of the agreement and attestation. The transaction(s) 152 used to record this may or may not pay Bob for his services.

Further, the disclosed process provides a mechanism preventing Bob applying his signature before Alice. This is significant in that, if Bob is witnessing Alice's agreement, then Bob should not sign until Alice has signed and indicated her agreement to Bob (he should not claim to have witnessed something that has not yet happened, and which he has not yet observed evidence of). The transactions 152 that are formed and recorded based on the disclosed mechanism remain in the blockchain 150 as an immutable record evidencing the order in which the signatures were applied.

As mentioned, metadata can be included in an unspendable output of a transaction 152 in order to store user content such as a document. In embodiments disclosed herein, such a mechanism is used to store an electronic copy of the witnessed document in the blockchain 150 as well.

Further, in accordance with embodiments disclosed herein, the blockchain functionality is combined with an additional inter-party communication function such as a video calling function providing a channel via which Bob can witness the fact that Alice agrees to the document.

Figure 3:
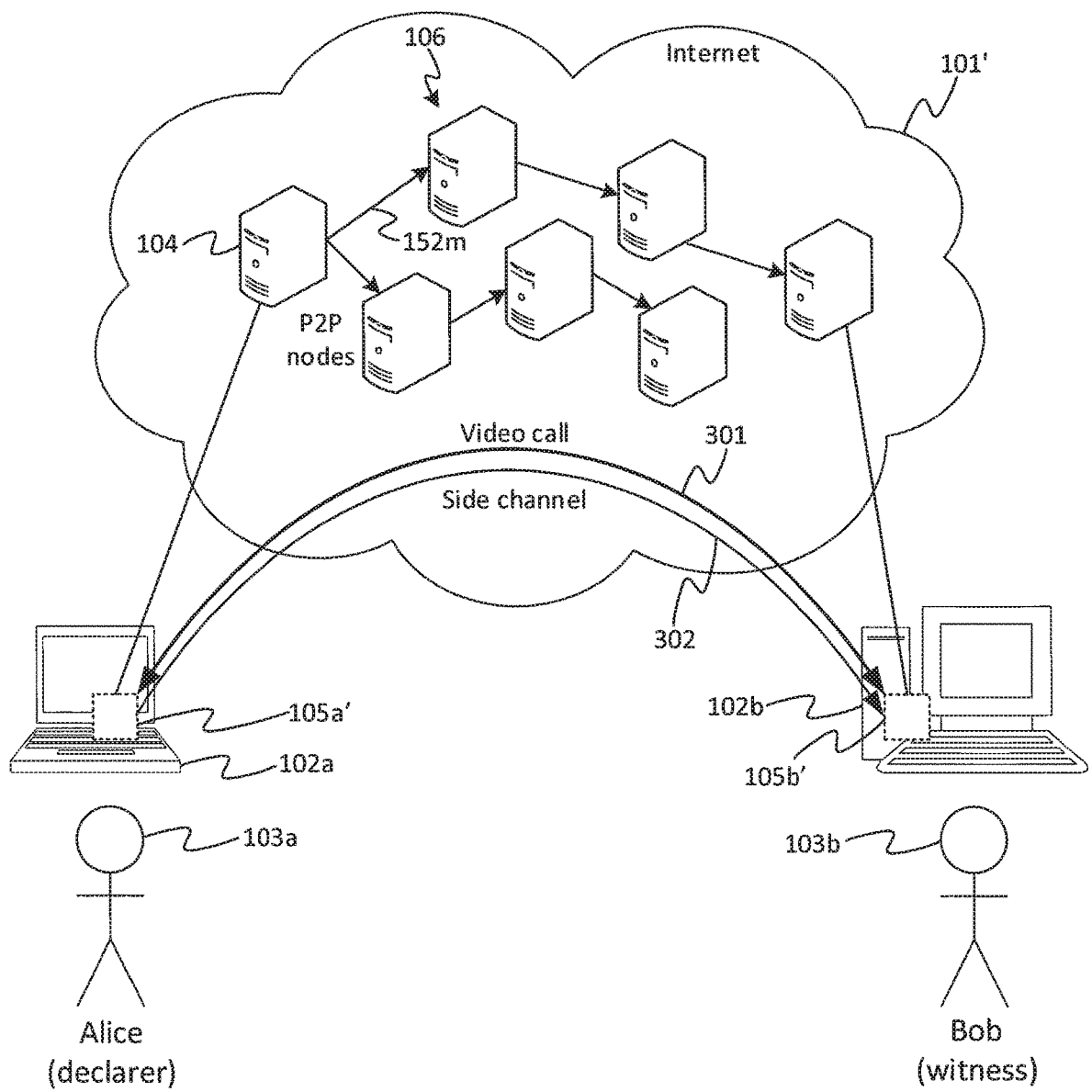
FIG. 3 is a schematic block diagram of another system for implementing a blockchain, FIG. 4 schematically illustrates a pair of terminals for use in the system of FIG. 3, FIG. 5 schematically illustrates an example set of transactions for evidencing agreement to a document in a blockchain according to a first method, FIG. 6 schematically illustrates example detail of some of the steps in the first method.
Figure 4:
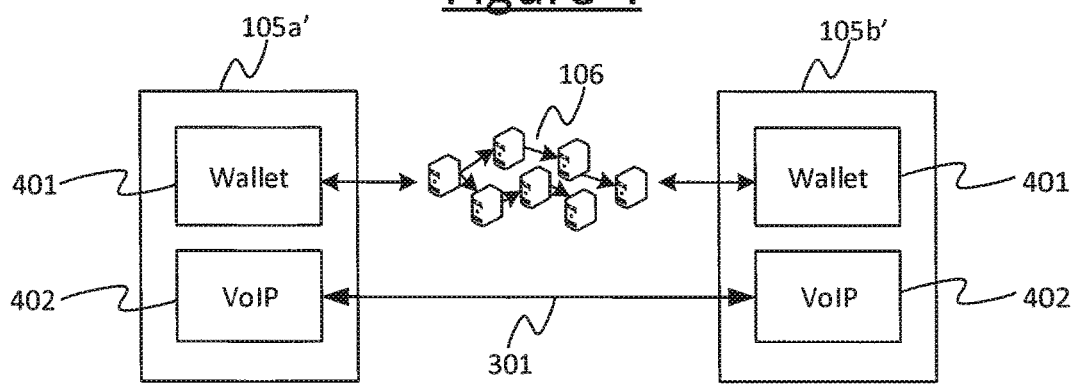

An example of this is illustrated in FIGS. 3 and 4. FIG. 3 shows a system 100' for implementing a blockchain 150. The system 100' is substantially the same as that described in relation to FIG. 1 except that additional communication functionality is involved. The client application on each of Alice and Bob's computer equipment 102a, 120b, respectively, comprises additional functionality compared to that shown in FIG. 1, and is hence labelled 105' (105a' for Alice's instance and 105b' for Bob's). Particularly, as shown in FIG. 4, the client application 105' run on each of Alice and Bob's computer equipment 102a, 102b comprises both a wallet function 401 and an inter-party communication function 402, e.g. a VoIP function, preferably with video calling functionality. Each of these functions 401, 402 may be implemented in the form of modules of software, instances of which are stored in the memory of each of Alice and Bob's computer equipment 102a, 102b, and arranged to run on the respective processing apparatus.

The wallet function 401 is configured to interface with the P2P network 106, in order to perform the functionality of formulating and sending transactions 152 and collating UTXO values, as described previously in relation to FIG. 1 and the Background section. The inter-party communication function 402, on the other hand, enables Alice 103a to establish a separate inter-party communication channel 301 with Bob 103b (at the instigation of either party or a third party). E.g. this inter-party communication channel 301 may comprise a VoIP channel and/or video link for conducting a voice and/or video call between Alice 103a and Bob 103b. The inter-party communication channel 301 may be established via the same packet-switched network 101 as the P2P overlay network 106. Alternatively or additionally, the inter-party communication channel 301 may be established via a different network such as a mobile cellular network.

The inter-party communication function 402 may also provide a side channel 302 for sending data, separately from the main inter-party communication channel 301. In embodiments this could comprise a non-user-facing data channel via which the client 105a' on Alice's equipment 102a can send data "behind the scenes" to the client 105b' on Bob's equipment 102b. Alternatively it could for example comprise an instant messaging (IM) channel, email service or other channel suitable for sending text and/or numbers. In embodiments this side channel 302 may be used to send Alice's signature to Bob, and/or a piece of secret information "X" (to be discussed in more detail shortly). The side channel 302 may be established via the same packet-switched network 101 as the P2P overlay network 106. Alternatively or additionally, the side channel 302 may be established via a different network such as a mobile cellular network. Also, the side channel 302 may or may not be established via the same network as the inter-party communication channel 301.

The wallet function 401 and communication function 402 are illustrated in FIGS. 3 and 4 as being integrated into the same client application 105'. However this is not limiting and instead they could be implemented in separate applications, or the wallet function 401 could be a plug-in to the communication application 402 or vice versa. Further, where the side channel 302 is used, this may or may not be established by the same application as the inter-party communication channel 301, or indeed the same application as provides the wallet function 401. It could be integrated within the same application as the inter-party communication function 401, or the wallet function 401, a plug-in to either of these, or a separate third application.

By whatever means the various functionality is implemented, consider now the following scenario.

Alice 103a would like to sign a deed or such like, with Bob 103b as a witness via the inter-party communication channel 301. They will sign with digital signatures and store this information on the blockchain 150. Alice is the signatory. She has a public key $P_A$. Bob is the witness. He has a public key $P_B$. Alice may have an electronic document pertaining to the deed she would like to sign.

In embodiments the communication channel 301 comprises a video link. In embodiments Alice and Bob will use the video link 301 to record the signing procedure. Optionally they may also store this recorded video information on the blockchain 150.

The following presents two methods, M1 and M2. In the first method M1, both Alice and Bob sign a single transaction. In the second method M2, there are two transactions: Alice signs the first before Bob can sign the second.

Figure 5:
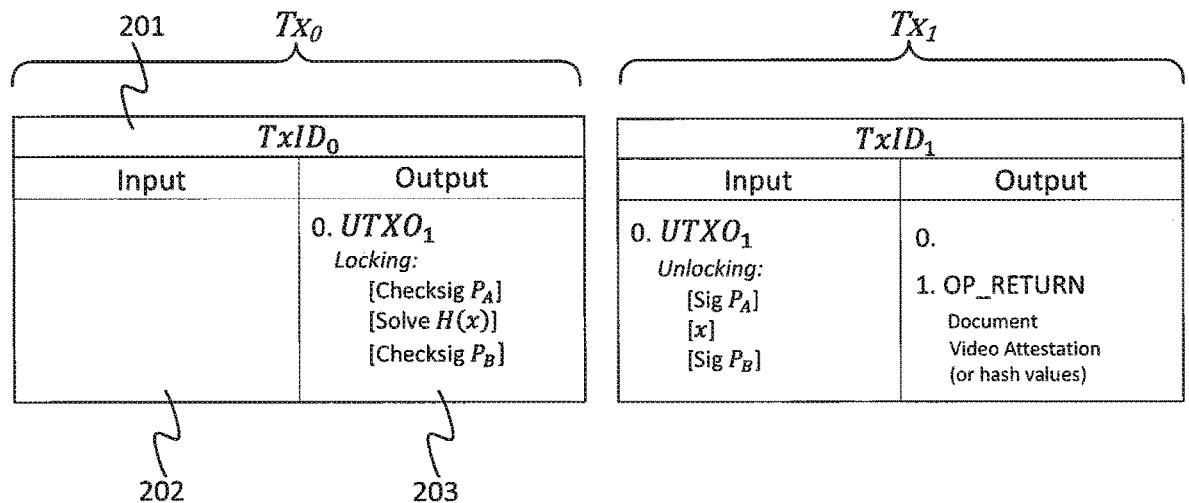

FIG. 5 shows a pair of example transactions that may be used in method M1. As will be discussed in more detail shortly, Alice constructs an initial transaction $Tx_0$ that produces $UTXO_1$ with the desired locking script. This is spent in transaction $Tx_1$ by providing Alice's signature, the pre-image of H(X) and Bob's signature, in that order.

Figure 6:
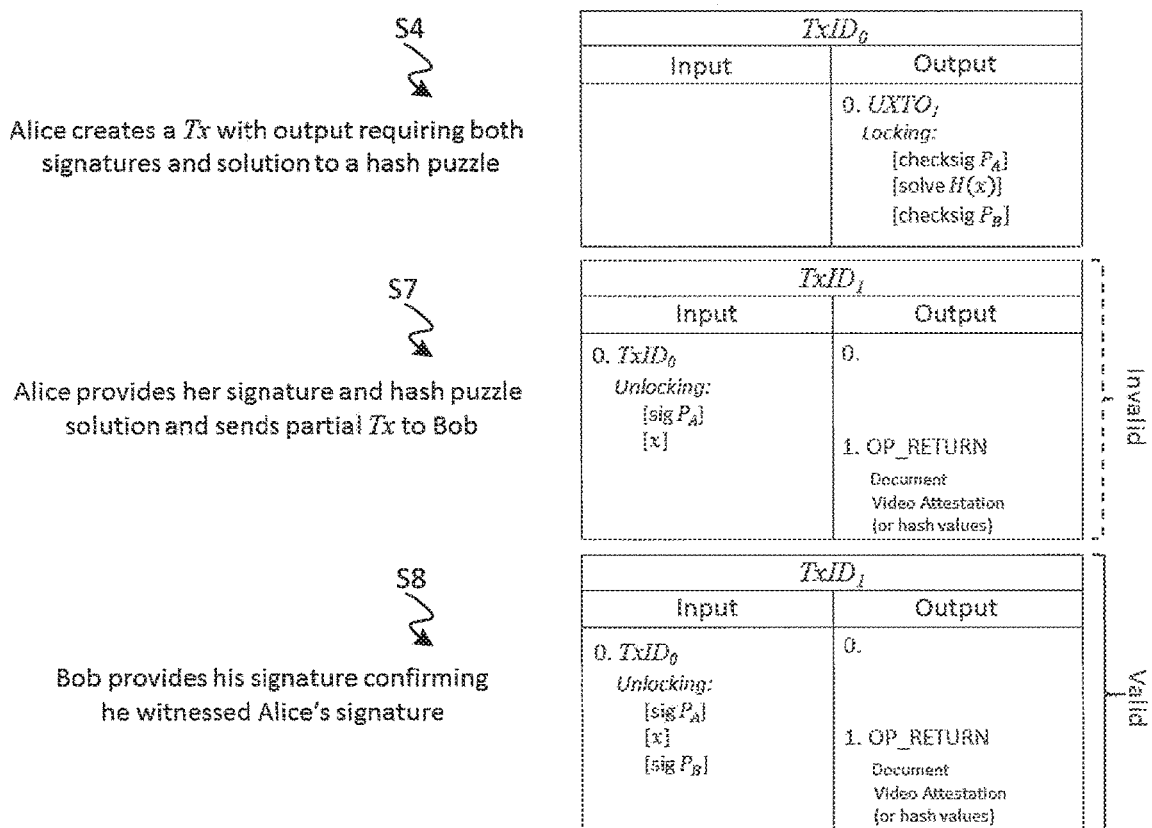

FIG. 7 is a flow chart setting out the steps in method M1. FIG. 6 shows the state of the transactions at certain steps during method M1.

In step S1, Alice 103a and Bob 103b open up a video channel 301 between them. This is the channel via which Bob will witness Alice's agreement. More generally they could use any form of inter-party communication channel 301 to communicate between them. E.g. alternatively the inter-party communication channel 301 could be a voice channel in which Alice's and Bob's voices can be recognized. However a video may be preferred for greater security so that Alice and Bob's images can be recognized in the video. Preferably the video also comprises audio for exchanging voice as well. This also provides evidence of the capacity and mental state of both parties at the time of signing. Optionally the video or other such media exchanged over this channel 301 is recorded in a data store (not yet in the blockchain 150 at the nodes 104). For instance it may be stored in the memory of Alice and/or Bob's computer equipment 102a, 102b, or the equipment of a third party, or at a server (e.g. in the cloud).

In step S2, Alice creates a secret X known only to herself, and hashes that secret, i.e. H(X). A hash herein refers to a cryptographic hash function, e.g. SHA256, BLAKE2, etc. H(X) means the hash function evaluated at X. The secret X could be any piece of data, known only to Alice or at least not known by Bob, and which it would be infeasible for Bob to guess. E.g. in embodiments X could be a numerical value or a text string. It could for instance be a random number, or a number or other value generated by some deterministic process that Bob does not know. As one example X may be a 512 bit long number, having 2^512 possible values and therefore no hope of Bob guessing it.

In Step S3, Alice creates a $UTXO_1$ that can be redeemed by providing her signature, the preimage of H(X), and Bob's signature. The preimage of H(X) means a value of H(X) that would result in H(X) for a given value of H(X), in other words the solution to H(X). In embodiments, the locking script may take a form that can be written schematically as follows:

Locking $UTXO_1$=[Checksig $P_A$][Solve H(X)][Checksig $P_B$].

To redeem this will require, in the input of a subsequent transaction $Tx_1$, an unlocking script signed by Alice and Bob and taking a form that may be written schematically as:

Unlocking=<Sig $P_B$><X><Sig $P_A$>.

When a node 104 receives $Tx_1$, the node tests whether it is valid. To do this, according to the interpretation rules for the Script language, the node 104 will concatenate the locking and unlocking scripts as follows:

<Sig $P_B$><X><Sig $P_A$>||[Checksig$P_A$][Solve H(X)] [Checksig $P_B$]

The interpreter at the node 104 will then process the locking and unlocking scripts together to determine whether $Tx_1$ is valid. According to the rules as applied by the node protocol that interprets the Script language, this works by first checking the rightmost input from the unlocking script (in this case Sig $P_A$) against the leftmost input from the locking script (in this case Checksig $P_A$), then checking the next rightmost input from the unlocking script (in this case X) against the next leftmost input from the locking script (in this case Solve H(X)), and so forth. Checksig is a function which checks whether the input signature in $Tx_1$ is authenticated by the respective public key P in the locking script of $Tx_0$. Solve H(X) is a function that checks that the value of X provided in the input of $Tx_1$ is a solution to the H(X). Remember also that the function Checksig (comprising opcode OP_CHECKSIG) removes its checked signature after performing the check. Solve H(X) on the other hand does not remove X. Therefore by the time the interpreter gets to checking the leftmost input from the unlocking script (Sig $P_B$) against the rightmost input from the locking script (Checksig $P_B$), then Alice's signature (Sig $P_A$) will have already been stripped away, but X will not have been stripped away. Hence, as a consequence of the way the node protocol interprets the locking and unlocking scripts according to the rules of the Script language, Bob cannot be required to sign anything that comprises Alice's signature. However according to embodiments disclosed herein he is required to sign something comprising X.

In embodiments Alice may be required to sign at least the locking script of $UTXO_1$, namely [Checksig $P_A$][Solve H(X)][Checksig $P_B$]. Optionally, the data Alice is required to sign may further comprise the unlocking script of $UTXO_1$ minus her and Bob's signature, i.e. <X>. Bob may be required to sign a portion of data comprising the locking script of $UTXO_1$ plus the unlocking script of $UTXO_1$ minus his and Alice's signature. I.e. Bob signs <X>||[Checksig $P_A$][Solve H(X)][Checksig $P_B$].

Both Alice and Bob sign $TxID_0$ when signing $Tx_1$ as it's the input. [Checksig $P_A$][Solve H(X)][Checksig $P_B$] is included in the calculation of $TxID_0$ as its part of the transaction. Therefore, Alice and Bob indirectly sign the conditions.

Exactly what needs to be signed may be settable using the SIGHASH flag. Note also that where it is said that a party signs a given portion of data (or "message"), in embodiments this may mean that the party in fact signs a transformation of that data or message such as a hash of the data or message (the hash is often taken as read when referring to signing). I.e. they hash or otherwise transform the data first, and then sign the hashed or transformed version with their private key. This has the advantage that the hash typically reduces the size of the data being signed before it is signed with the private key. E.g. Alice may sign the transaction $TxID_0$ which is a hash of the whole of $Tx_0$. Bob may sign a hash of: <x>||[Checksig $P_A$][Solve H(X)][Checksig $P_B$].

If Alice and Bob have not provided a valid signature signing the required parts of the transaction $Tx_0$, then $Tx_1$ will not be validated and hence not propagated throughout the network 106 to be recorded in the copy of the blockchain 150 at each of the storing nodes 104S.

It will be appreciated that the above is just one example of a scripting language and corresponding node protocol. More generally other languages could be used to include a similar condition for validation in the output of $Tx_0$. To implement method M1 in a broader sense, the minimum that will be required is to create a condition whereby Bob has to sign some defined portion of data that comprises at least X, and Alice has to sign some defined portion of data that could comprise anything (depending on the protocol used). The exact portions of data that Bob and Alice are required to sign may be settable as part of the script language and node protocol, or may be fixed by the node protocol for a given transaction structure.

At step S4 Alice creates a partial version of the transaction $Tx_1$ that spends $UTXO_1$. In embodiments the electronic document (or a hash of it) may be included in the transaction, for example in an unspendable output (OP_RETURN). This will mean that, if $Tx_1$ is validated, the document will be immutably stored in the transaction $Tx_1$ in the blockchain 150. However this is optional.

Alice does not yet add her signature or the preimage of H(X) to $Tx_1$.

The reason for including H(X) rather than X in the locking script of $Tx_0$ is that otherwise the raw value of X would be revealed (remember that the blockchain 150 can be inspected by Bob).

At Step S5 Alice sends the partial transaction $Tx_1$ to Bob via the side channel 302. Alternatively it could be communicated via the main channel 301, e.g. by Alice displaying a visual code such as a QR code in the video, or by embedding an invisible or inaudible signal in the video or audio respectively.

Note: at this point Bob is not able to provide a valid signature for $Tx_1$ as he does not know the preimage of H(X). This is because although Alice's signature is ignored when Bob constructs his signature (see explanation above), the preimage of the hash puzzle cannot be ignored. I.e. the portion of data which Bob is required to sign for $Tx_1$ to be valid does include X.

At step S6, Bob asks Alice whether she agrees to the terms of the deed (or more generally document), and Alice confirms. This is conducted via the inter-party communication channel 301, preferably via video with voice. However an audio-only channel could instead be used, especially if the voices are recognizable in the audio. Bob may ask Alice orally whether she agrees to the document, and Alice may reply orally. Alternatively or additionally, one or both parties could use a visual form of communication such as sign language. The communication could even be conducted via another form of media channel 301 such as shared virtual whiteboard that lets the parties write in their own recognizable handwriting on shared workspace, e.g. through a tablet and electronic stylus at each party's terminal 102a, 102b. Whatever means is used, it should at least allow Alice's declaration of agreement to be recognizable as originating from Alice, at least to a reasonable degree of certainty. Preferably Bob's question is also recognizable as originating from Bob. However in other scenarios Bob's question could be optional (i.e. Alice could make the declaration without being prompted), as long as Alice's agreement is witnessed by Bob via the channel 301.

Whatever form of media is used, the agreement is thus captured over the media link 301. Optionally this media is recorded at least temporarily in a data store of Alice, Bob or a third party (e.g. on Alice or Bob's local storage drive or in a conventional cloud storage account). At least a part of the media which includes Alice's agreement is recorded, and preferably also Bob's question. Whether or not the recording is also to be stored in the blockchain 150, this recording provides a record evidencing the agreement.

At step S7 Alice provides a signature for $Tx_1$ and a solution to the hash puzzle H(X). She sends these to Bob via the side channel 302. Alternatively it could be communicated via the main channel 301, e.g. by Alice displaying a visual code such as a QR code in the video, or by embedding an invisible or inaudible signal in the video or audio respectively. If X takes a form that is meaningful to humans, Alice could even communicate it herself orally or manually over the video or audio channel. E.g. X could be a password, or passage from a book which Alice reads out or tells Bob to look up.

In embodiments Alice's client application 105a' (or more generally software comprising one or more applications), may be configured to automatically withhold and then release the solution X to Bob, automatically sending it or allowing it to be sent on condition of automatically detecting that Alice has provided her signature and/or that she has signalled her agreement over the channel 301 (e.g. the latter could be detected using machine intelligence techniques). Alternatively Alice may send or trigger the sending of X manually. In general, any means of making X temporarily unavailable to Bob could be used.

At step S8, Bob now knows X and can provide a valid signature for $Tx_1$. Bob signs $Tx_1$, thus completing $Tx_1$.

At optional step S9, the video data, or hash of the video data, may be stored in transaction $Tx_1$, for example in an OP_RETURN. This will mean that, if validated, the video or other such media evidencing the agreement will be immutably stored in the transaction $Tx_1$ in the blockchain 150. However this is optional. Note: this part of the output must not have been signed previously by Alice and Bob, which can be achieved using any SIGHASH flag other than SIGHASH_ALL. The reason for this is that the signature signs the message, which is the transaction data. Alice signs the document and is recorded doing so. If the video is then added, the recording is added, this changes the message. Thus, Alice should sign the document alone and Bob can sign the video and document using the SIGHASH flags.

This video data may be signed by either Alice, Bob or both using separate signatures to those in steps S7 and S8.

At step S10, the transaction $Tx_1$ is now complete and can be sent to the network 106 by either Alice or Bob, where it is recorded immutably on the blockchain 150.

The fact that X was withheld from Bob until after Alice demonstrated her agreement to Bob and provided her signature Sig $P_A$, means that Bob's signature cannot be validly provided until at least that time. Since Bob's signing of X (and in embodiments X itself also being separately included in $Tx_1$) is a condition for $Tx_1$ to be valid according to the locking script, then this means that it is not possible for Bob or anyone else to have $Tx_1$ propagated through the network 106 or accepted into the blockchain 150 until Bob has been provided with X. It is not cryptographically possible for Bob to provide a valid signature until then. $Tx_1$ remains immutably recorded in the blockchain 150 as a cryptographic demonstration of the order of the signatures. For additional security, this may optionally be accompanied in $Tx_1$ by a copy of the document and/or video or other such media (or a hash or other such transformation thereof).

Method M1 provides a method that uses only a single transaction $Tx_1$ to record the evidence. This has the advantage that the evidence is all recorded at one point in the blockchain 150, and thus can be more efficiently searched for and found if any party such as Alice, Bob or another member of the public wishes to query it at a later date. Remember that a blockchain 150 comprises no index of the transactions, so without separately maintaining a separate index which is in itself burdensome, then searching the blockchain requires traversing the transactions of the blockchain to search for the desired transaction. One transaction at one point in the blockchain 150 is more efficient to find in terms of compute resource than two transactions scattered at arbitrary respective points in the chain. Fewer transaction also requires less propagation and therefore less burden on the network 101, 106.

Method M2 provides a method that uses two transactions to achieve a similar result as Method M1. This has the advantage that, although described by way of example below in terms of the Script language, Method 2 can also be implemented using account-based transaction models and other protocols that do not allow for scripts to define custom conditions for validity.

FIG. 8 shows a set of example transactions that may be used in method M2. As will be discussed in more detail shortly, Alice constructs an initial transaction $Tx_0$, which is spent in transaction $Tx_1$ by Alice providing her signature. Transaction $Tx_2$ spends the output of $Tx_1$ by Bob providing his signature.

Figure 10:
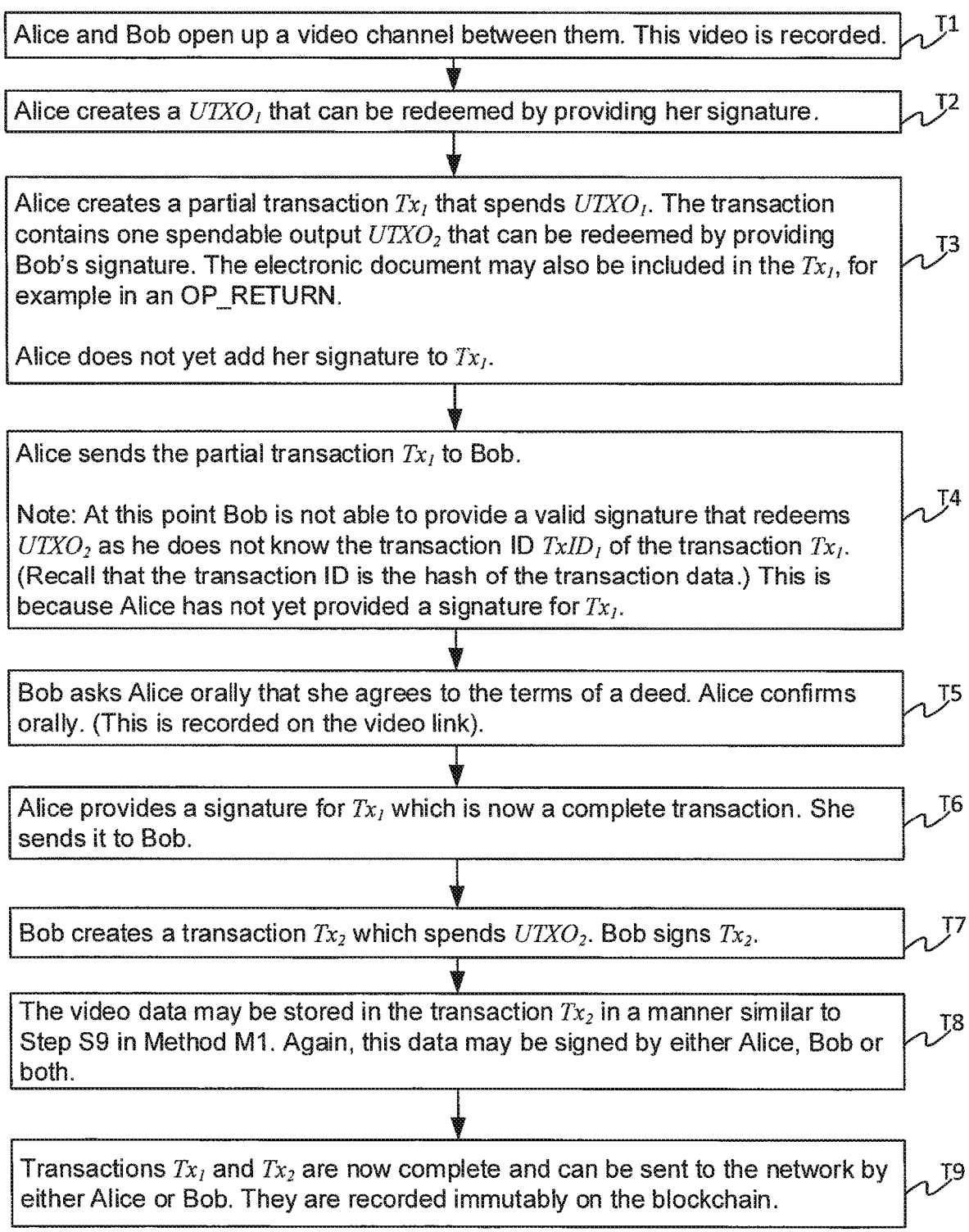
FIG. 10 is a schematic flow chart showing a second method using the set of transaction shown in FIGS. 8 and 9, FIG. 11 schematically illustrates an example set of transactions for evidencing agreement to a document in a blockchain according to a variant of the first method.

FIG. 10 is a flow chart setting out the steps in method M2. FIG. 9 shows the state of the transactions at certain steps during method M2.

At step T1, Alice and Bob open up a video channel or other media channel 301 between them. This video or other media may be recorded.

At step T2, Alice creates a $UTXO_1$ that can be redeemed by providing her signature.

At step T3, Alice creates a partial transaction $Tx_1$ that spends $UTXO_1$. The transaction contains one spendable output $UTXO_2$ that can be redeemed by providing Bob's signature. Optionally, the electronic document (or a hash of it) may also be included in $Tx_1$, for example in an OP_RETURN.

In the scenario of method M2, Alice is required to sign the transaction ID of $Tx_0$ ($TxID_0$) and include this signature (Sig $P_A$) in the input of $Tx_1$ in order for $Tx_1$ to be valid. $TxID_0$ is a hash of the whole of $Tx_0$. Bob will be required to sign the transaction ID of $Tx_1$ ($TxID_1$) and include this signature (Sig $P_B$) in the input of a further transaction $Tx_2$ in order validly redeem the output $UTXO_2$ of $Tx_1$. $TxID_1$ is a hash of the whole of $Tx_1$, which includes Alice's signature Sig $P_A$. Thus Bob providing a valid signature in $Tx_2$ is dependent on Alice's signature in $Tx_1$. If Bob does not provide a signature or signs the wrong thing, $Tx_2$ will not be deemed valid by the nodes 104 and hence will not be propagated and recoded in the blockchain 150.

Alice does not yet add her signature to $Tx_1$.

At step T4, Alice sends the partial transaction $Tx_1$ to Bob. Note: at this point Bob is not able to provide a valid signature that redeems $UTXO_2$ as he does not know the transaction ID $TxID_1$ of the transaction $Tx_1$. (Recall that the transaction ID is the hash of the transaction data.) This is because Alice has not yet provided a signature for $Tx_1$.

At step T5, Bob asks Alice orally that she agrees to the terms of the deed (or more generally document). Alice confirms orally. This is captured on the video link 301. Alternatively or additionally another form of communication and/or media could be used over the link 301, e.g. sign language, etc. (see previous discussion in relation to method M1).

At step T6, Alice provides a signature for $Tx_1$ which is now a complete transaction. She sends it to Bob via the side channel 302. Alternatively it could be communicated via the main media channel 301 (again, see the corresponding discussion in relation to method M1).

At step T7, Bob creates a transaction $Tx_2$ which spends $UTXO_2$. Bob signs $Tx_2$.

In optional step T8, the recorded video or other media data may be stored in the transaction $Tx_2$ in a manner similar to Step S9 in Method M1. Again, this data may be signed by either Alice, Bob or both.

At step T9, transactions $Tx_1$ and $Tx_2$ are now complete and can be sent to the network 106 by either Alice or Bob. They are recorded immutably on the blockchain 150. In Method M2 no X is needed, but the order of the signatures is still forced because $TxID_1$ has to exist before $Tx_2$ can be validly generated.

Method M2 can work even with account-based models and transaction protocols that do not allow scripts to define customizable conditions for validation. Note that all the transactions involved in method M2 use only standard scripts which correspond to common or standard validation criteria many non-script based and account-based transaction protocols.

Methods M1 and M2 share a number of unifying features. Firstly, the sequence of signatures is fixed: Alice must provide her signature before Bob is able to provide his signature. Further, in embodiments of both methods, the video of the signing of the transaction(s) provides proof of capacity for the signor Alice and witness Bob. The inclusion of video data, or hash of the video data, within the transactions is optional. The inclusion of any electronic copy of the document pertaining to the deed, or hash of the document, is also optional.

In both methods, the record of the signatures and optional supplementary data (document and/or video data) is stored on the blockchain and is immutable. When the transaction(s) is/are submitted to the blockchain the digital signatures are checked by nodes 104. Only transactions with valid signatures will be stored on the blockchain 150. Therefore, a third party can trust the validity of the signatures without having the capability to check them itself. The record is replicated by full-copy nodes 104S on the distributed network, and can therefore be easily obtained by third parties.

In embodiments, through use of a hash-based message authentication code (HMAC), the two parties can transmit partially-filled transactions and verify that there were no unexpected changes to the transaction or transmission errors.

Note: the amount of digital assets transferred in the spendable UTXO outputs of the transaction(s) is not relevant for the present purposes. So in Method 1, that is output 0 of $Tx_0$ ($UTXO_1$) and output 0 of $Tx_1$. In Method M2 see output 0 of $Tx_0$ ($UTXO_1$), output 0 of $Tx_1$ ($UTXO_2$) and output 0 of $Tx_2$. There could be more spendable outputs in any given one of the transactions in order to split the input value, or indeed other inputs that are not shown. Alice could transfer some or all of the digital asset defined in the UTXO to herself, to Bob for his services rendered, or to another party. In practice, Alice will probably need to leave enough of a miner fee to ensure that the transaction(s) is successfully accepted by miners, and in embodiments to pay for storing the record of the document and/or video (this is stored on all storage nodes 104S in the copy of the blockchain 150 at each node 104, though only the winning miner 104M—who may also be a storage node 104S—gets the mining fee). However in other use cases, such as a private or consortium blockchain, the miners 104M do not necessarily need to be motivated by reward.

Figure 11:
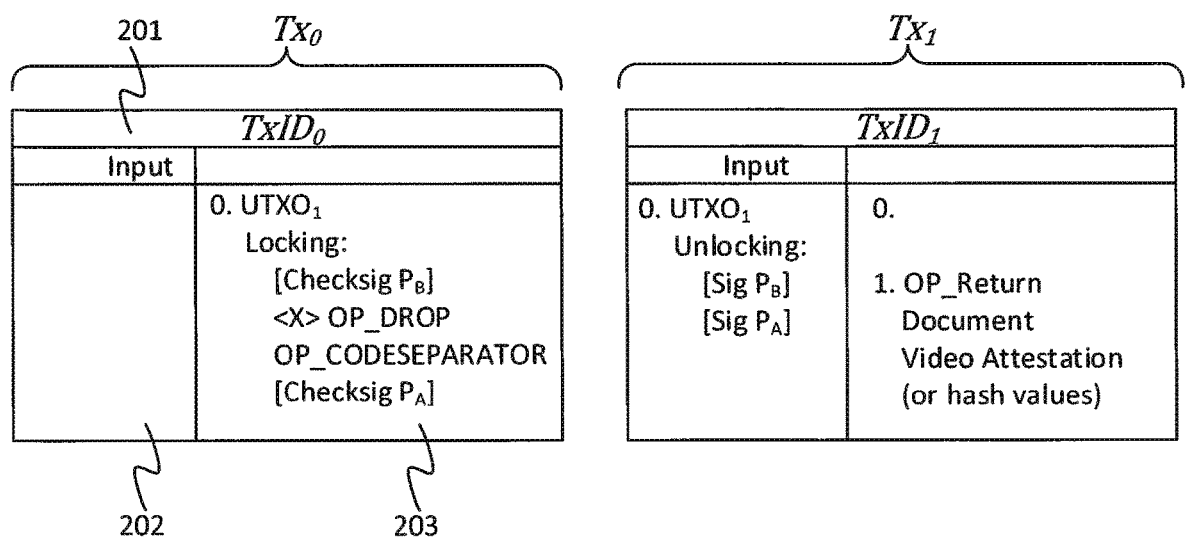
Figure 12:
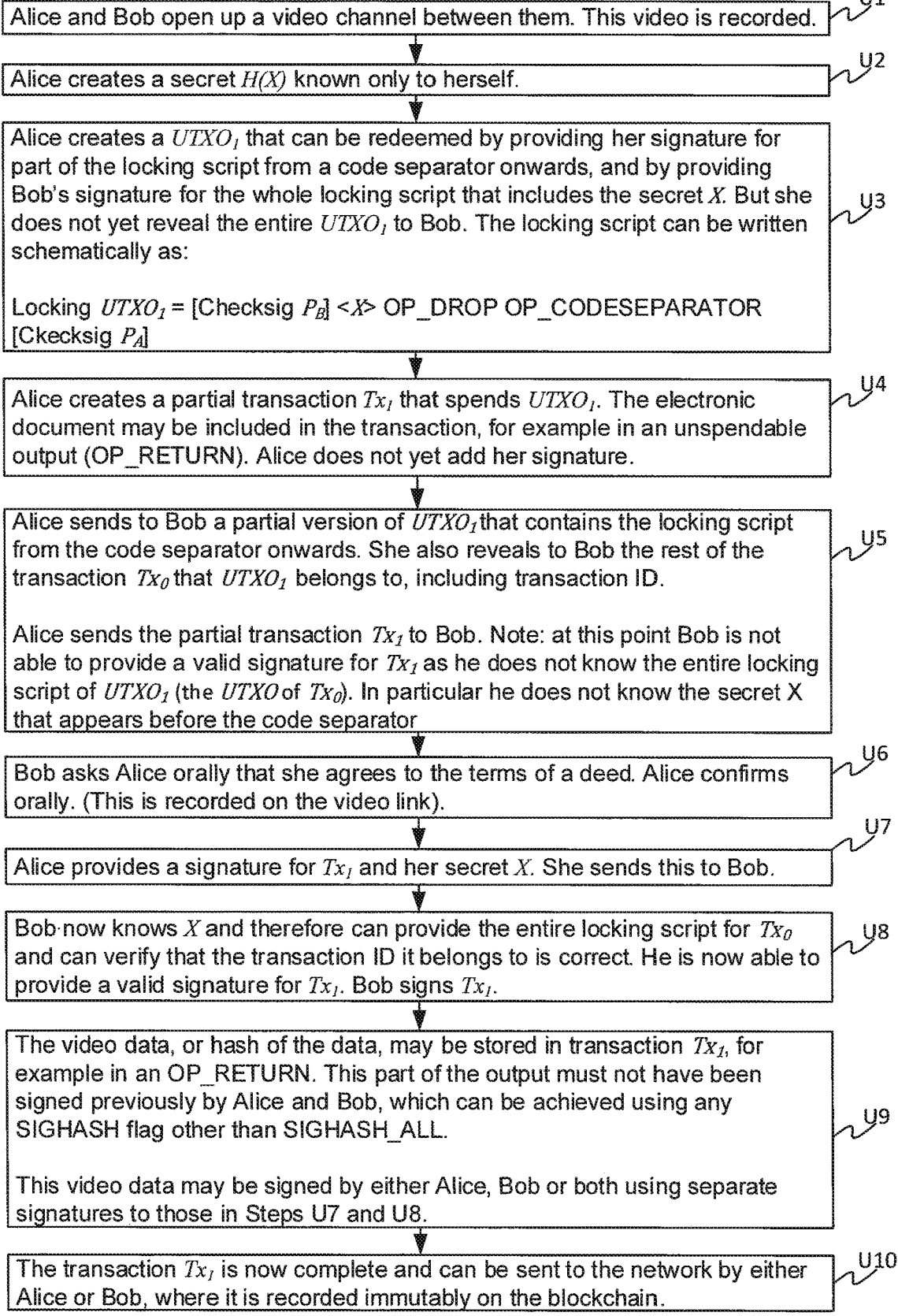
FIG. 12 is a schematic flow chart showing the steps of said variant of the first method using the set of transactions illustrated in FIG. 11.

FIGS. 11 and 12 illustrate an alternative implementation of Method M1, using a single transaction with a code separator instead of a hash of X FIG. 11 is a schematic diagram of the transactions used in an example this variant of the method. Alice constructs an initial transaction $Tx_0$ that produces $UTXO_1$ with the desired locking script. This is spent in transaction $Tx_1$ by providing Alice's signature and Bob's signature, in that order. In this example the secret X is not actually part of transaction $Tx_1$ However, in order for Bob to create a valid signature in $Tx_1$ he still needs to know X.

FIG. 12 shows a corresponding flow chart.

This embodiment uses a code separator in the locking script of $Tx_0$ to control what part of the locking script Bob needs to sign. Alice then withholds part of the locking script that Bob is required to sign, in an analogous manner to the way she withholds X in the previously-described embodiments.

A signature will sign the output of $Tx_1$. In embodiments the sighash flag in the unlocking script sets which parts of $Tx_1$ are signed. However, a signature also signs part of the locking script, and the locking script is included in $Tx_0$. Without code separators, then in at least one protocol, it is always the whole of the locking script that is signed by default. With code separators on the other hand, the party who formulates $Tx_0$ can control which part is signed.

At step U1, Alice and Bob open up a video channel between them. This video may be recorded.

At step U2, Alice creates a secret X known only to herself.

At step U3, Alice creates a $UTXO_1$ that can be redeemed by providing her signature for part of the locking script from a code separator onwards, and by providing Bob's signature for the whole locking script that includes the secret X.

The locking script can be written schematically as:

Locking $UTXO_1$=[Checksig $P_B$]<X>OP_DROP OP_CODESEPARATOR[Checksig $P_A$].

To create a valid signature, Alice must sign everything in the locking script except [Checksig $P_B$]<X>OP_DROP. Bob must sign everything in the locking script, including [Checksig $P_B$]<X>OP_DROP.

Alice does not yet reveal the entire $UTXO_1$ to Bob (it may not have yet been sent to the network 106 and mined in a block 151).

At step U4, Alice creates a partial transaction $Tx_1$ that spends $UTXO_1$. The electronic document may be included in the transaction, for example in an unspendable output (OP_RETURN).

Alice does not yet add her signature.

At step U5, Alice sends to Bob a partial version of $UTXO_1$ that contains the locking script from the code separator onwards. She also reveals to Bob rest of the transaction $Tx_0$ that $UTXO_1$ belongs to, including transaction ID.

Alice sends the partial transaction $Tx_1$ to Bob.

Note: At this point Bob is not able to provide a valid signature for $Tx_1$ as he does not know the entire locking script of $UTXO_1$ (the UTXO of $Tx_0$). In particular he does not know the secret X that appears before the code separator.

Alice does not strictly need to send a partial version to Bob in advance (i.e. step U5 is optional). However, one advantage of doing this is that when she provides her signature, Bob can check that it is valid because he will have knowledge of all the parts of the transaction that Alice signs.

At step U6, Bob asks Alice orally that she agrees to the terms of a deed. Alice confirms orally. This may be recorded on the video link.

At step U7, Alice provides a signature for $Tx_1$ and her secret X. She sends this to Bob.

At step U8, Bob now knows X and therefore can construct entire locking script $UTXO_1$ and can verify that the transaction ID it belongs to is correct. He is now able to provide a valid signature. Bob signs $Tx_1$.

At step U9, optionally the video data, or hash of the data, may be stored in transaction $Tx_1$, for example in an OP_RETURN. This part of the output must not have been signed previously by Alice and Bob, which can be achieved using any SIGHASH flag other than SIGHASH_ALL.

This video data may be signed by either Alice, Bob or both using separate signatures to those in Steps U7 and U8.

At step U10, the transaction $Tx_1$ can be sent to the network by either Alice or Bob, where it is recorded immutably on the blockchain 150. $Tx_0$ may be sent at the same time, or before of after $Tx_1$.

It will be appreciated that the above embodiments have been described by way of example only.

For instance, as mentioned, it is not necessary for the party 103a, 103b that signs a given transaction to be the party who creates the transaction in the first place, nor who assembles the complete transaction, nor who sends the complete transaction to the network 106. By analogy, a third party can draft a paper deed on behalf of Alice and Bob, remaining only to be signed by Alice and Bob. A similar thing can be true of electronic transactions 152. Similarly it is possible for someone else to send the signed deed to its place of storage.

The minimum that needs to be provided by first party is the signature of the second party, and the minimum that needs to be provided by the second party is the signature of the second party. Other elements of the transaction could be created by the first party, second party, or elsewhere by a third party, or any combination of these parties. In embodiments which use the secret X, then X is preferably also provided to the second party by the first party, but could alternatively X could be a shared secret shared between the first party and a trusted third party, and the secret X could be provided to the second party by the trusted third party.

The elements of the transaction could be assembled by the first party, second party or any third party, or a combination thereof. The complete transaction could be sent to the network by the first party or second party directly, or could be forwarded to the network 106 via a third party.

Further, the scope of the present disclosure is not limited to the particular transaction protocol or node protocol discussed above. E.g. similar functionality as described in relation to methods M1 and M2 may be implemented using other scripting languages, depending on what language or languages are recognized by the node protocol applied by the nodes 104 of the particular system in question.

In some blockchains, the transactions use an account-based protocol which does not use the concept of one transaction in the sequence "spending" or redeeming the output of another transaction in the sequence. In account-based blockchains, accounts are generally identified by account addresses. The current state of all accounts is stored by the miners separate to the blockchain and is updated constantly. A transaction has sender and recipient fields and is said to be transmitted to an account addressed in the recipient field from an account addressed in the sender field (although physically the transaction is actually sent from a terminal to a blockchain node for validation and propagation to other blockchain nodes; the accounts themselves are logical constructs defined by the state of the blockchain, which in turn is defined by the sequence of transactions it contains). The transaction may for example transfer a quantity of digital asset between the sender and recipient accounts, causing that amount to be deducted from the balance of the sender account and added to the balance of the recipient account. An account is created by sending a transaction to a previously non-existent account address (i.e. an account address which has never been included in any earlier transaction on the blockchain) and subsequent transactions involving that account will specify its address in their sender or recipient fields. Hence, all transactions on the blockchain relating to a given account (including the transaction which creates it) are linked by a common account address.

Thus an account-based model, transactions do not work based on a system of UTXOs or such like, whereby each transaction spends or redeems the output of a preceding transaction, Instead, transactions are ordered using a running transaction tally of the account (also called the "position" or "nonce", not to be confused with the proof-of-work nonce). This value is signed by the sender as part of their cryptographic signature and is hashed as part of the transaction reference calculation. Thus method M2 may still be implemented in account-based protocols even if they do not allow for a custom script.

In the account-based case, the transaction ID from transaction 1 can be optionally included in the data field of transaction 2. It then reduces to the same case as method M2. In some account-based protocols, a smart contract may be used to take the role of the locking script. In smart contracts one can require signatures that sign specific bits of data. Therefore, one may write a smart contract that requires a signature from Alice, then a signature from Bob that specifically signs Alice's signature. In this case, as in the UTXO-based version of method M2 described above, the information that Bob does not know is itself Alice's signature.

In further variants, if the transaction protocol and node protocol allow for a more flexible scripting language, all sorts of variants of the conditions validation could be programmed into the one or more transactions. E.g. it could be possible to write a custom script that requires Bob to sign a portion of data comprising Alice's signature (or a transformation thereof) in the same transaction. This would provide a single transaction test as in method M1, but with no need for X as in method M2. Alice simply withholds her signature from Bob until after she has signed and declared her agreement via the communication channel 301.

Furthermore, while the above has been described in terms of a public blockchain, this is not limiting and instead the blockchain 150 could be for example a consortium blockchain used between a select group of organizations, or even a private blockchain within a given organization.

Note also that order described above is not essential for all the steps in methods M1 and M2. For instance referring to step S5 in method M1, Alice does not necessarily have to send the partial transaction to Bob at this point. She could wait until step S7 to send the X and her signature together in the partial transaction $Tx_1$. Similarly, as another example, in method M2 Alice does not necessarily send the partial $Tx_1$ to Bob at step T4, but could wait to send together with her signature at step T6. Also, as mentioned, it is possible for another party to provide the partial transactions, or another party trusted by Alice could even be responsible for sending X to Bob. More generally, the crux is that information is withheld from Bob that Bob is required to sign to provide a valid signature that will be validated by the nodes 104. Also, where it is said that the piece of information (such as the piece of secret information, e.g. X) is withheld from Bob or made unavailable to Bob, this does not necessarily have to imply it existed beforehand. In some embodiments it could be generated after Alice provides her signature and/or after she indicates her agreement to Bob.

Another example variant of method M1 is as follows. As mentioned, the reason for including H(X) rather than X in the locking script of $Tx_0$ is that otherwise the raw value of X would be revealed in the blockchain 150. However in principle Alice could also withhold $Tx_0$ as well until both $Tx_0$ and $Tx_1$ are ready to send to the network 106 (remembering that some systems have provisions for orphan transactions). In this case, then [Solve H(X)] in the locking script of $Tx_0$ could be replaced with a function which simply checks for equality with X (e.g. using the opcode OP_EQUALVERIFY).

Other variants of method M1 and/or M2 may become apparent to a skilled person once given the underlying principle as explained herein.

Moreover, although the above has been described in terms of Alice agreeing to the contents of a document, this is not essential. For example, Alice's agreement could just be the agreement of a spoken deed or other set of one or more conditions. More generally, the method may be used in relation to any statement defined in any form, written or otherwise, specified on any medium, electronic or otherwise. Nor does the term "statement" as used herein limit the nature of what is being agreed to. E.g. it could be any statement of fact or opinion made by Alice, Bob or another party; or any proposition put to Alice by Bob or another party.

More generally still, according to one aspect disclosed herein there is provided a computer-implemented method of using a blockchain to evidence that a first party agrees to a statement; the method comprising, at computer equipment of a second party: the second party receiving confirmation that the first party agrees to the statement; the second party receiving a piece of information of the first party that is unavailable to the second party until after said confirmation, and after the first party has generated a cryptographic signature of the first party to indicate said agreement in addition to said confirmation; to indicate that the second party attests to the receipt of said confirmation by the first party, the second party generating a cryptographic signature of the second party by signing a portion of data comprising said piece of information or a transformation thereof; and sending to a network of nodes, or causing to be sent to the network, one or more transactions in a form comprising the signature of the first party included in at least one of the one or more transactions and the signature of the second party included in at least one of the one or more transactions, the network being configured to propagate each transaction across the network to be recorded in a copy of the blockchain maintained at each of at least some of the nodes on condition of meeting a validation condition; wherein the validation condition is configured to validate one of the one or more transactions on condition that: the signature of the first party is included in one of the one or more transactions, the signature of the second party is included in one of the one or more transactions, and the signature of the second party was generated by signing said portion of data.

Note that in Method M2, for the second transaction to be validated requires the first transaction to be valid also. When a transaction is validated by a node it checks that it is spending a previously validated transaction with output that is unspent. Hence it is true of Method M2 that the second transaction is validated on condition that signature of the first party is included in one of the transactions (the first transaction), as well as requiring that the signature of the second party is included in the second transaction, and that the signature of the second party was generated by signing said portion of data. In method M1 an individual transaction is validated on condition that the two signatures are included in that same transaction.

The piece of withheld information may comprise the signature of the first party or a separate piece of information, e.g. a random number, received together with or separately from the signature of the first party. In the case of a separate piece of information, this may also be included in one of the one or more transactions to be sent to be recorded in the blockchain.

In embodiments, the method may comprise the second party receiving at least one of the one or more transactions in partial form. The partial form may be received from the first party, or a third party facilitating the recordal. In embodiments, the method may comprise the second party receiving the signature from the first party. The signature of the first party may be received as part of the partial form of the one or more transactions or separately. In embodiments the second party completes the one or more transactions by including the signature of the second party into the partial form. If received separately the second party may also add the signature of the first party to complete the transaction. Said sending to the network may then comprise the second party forwarding the completed transactions to be propagated thought said network of nodes and thereby recorded in the blockchain. Said forwarding may comprise sending directly to one of said nodes, or sending to computer equipment of a third party to be forwarded onward directly or indirectly to one of said nodes.

In alternative embodiments, the second party may create the one or more transactions including said code at the computer equipment of the second party once having received the signature of the first party and (if separate) the piece of information of the first party. The second party may then forward the completed form of the one or more transactions to be propagated thought said network of nodes and thereby recorded in the blockchain (again, wherein said forwarding may comprise sending directly to one of said nodes, or sending to computer equipment of a third party to be forwarded onward directly or indirectly to one of said nodes).

In yet further alternatives, the first party may send the partial form of the one or more transactions, the signature of the first party, and the piece of secret information (if separate from the signature) to a third party, and the second party may send the signature of the second party to the third party, in order for the third party to assemble the complete form of the one or more transactions based on these elements received from the first and second parties. The third party may then forward the one or more transactions directly or indirectly to one of said nodes to be propagated throughout the network and thereby recorded in the blockchain, Or the first party may forward the signature of the first party and (if separate) the piece of secret information to a third party, and the second party may forward the signature of the second party to the third party, for the third party to assemble the one or more transitions. Again, the third party may then forward the one or more transactions directly or indirectly to one of said nodes to be propagated throughout the network and thereby recorded in the blockchain.

The signature of the first party may be generated by the first party signing at least part of at least one of the one or more transactions or a transformation thereof, e.g. a hash of some or all of one or both of the transactions. The portion of data signed by the second party may also comprise part or all of at least one of the transactions or a transformation thereof, e.g. a hash. In embodiments the portion of data to be signed by the second party may be specified by a protocol applied at each of the nodes, or code included in the one or more transactions, or a combination of these.

In embodiments the statement may be a statement in a document.

In embodiments a record of the document may be included in one of the one or more transactions and thereby stored in the blockchain.

The record of the document may comprise the document itself in clear form, or a transformation of the document such as a hash of the document, or the document in encrypted form.

In embodiments the record of the document may be cryptographically signed by one or both of the first and second parties.

To implement this, in embodiments the data signed to generate the first and/or second signature may comprise the record of the document. Alternatively or additionally, the first and/or second party may apply a separate cryptographic signature to the record of the document.

In embodiments, the portion of data signed by the second party to generate said signature of the second party may comprise the record of the document, and/or data signed by the first party to generate said signature of the first party may comprise the record of said document.

In embodiments, the method may further comprise establishing a video call between the first party and the second party, wherein the receipt of said confirmation may comprises the second party receiving the confirmation from the first party visibly or audibly via the video call.

In embodiments, a record of the video, comprising at least a period of the video including said visible or audible confirmation, may be stored for future reference.

In embodiments said record of the video may be included in one of the one or more transactions and thereby stored in the blockchain.

The record of the video may comprise the video itself in clear form, or a transformation thereof, such as a hash of the relevant part of the video, or the video in encrypted form.

In embodiments the record of the video may be cryptographically signed by one or both of the first and second parties To implement this, in embodiments the data signed to generate the first and/or second signature may comprise the record of the video. Alternatively the first and/or second party may apply a separate cryptographic signature to the record of the video.

In embodiments the validation condition may be configured for each transaction, at least in part, by respective code included in the transaction, and/or in a preceding transaction of the blockchain. E.g. the preceding transaction may be a transaction pointed to by the transaction in question.

Alternatively or additionally, the validation condition may be defined at least in part by a common node protocol implemented at each of the nodes.

The preceding transaction may already be included in the blockchain at the time the one or more transactions is/are created and/or sent, or the preceding transaction may be prepared ready to be included in the blockchain at that time.

In a first class of embodiments, the one or more transactions may consist of one transaction comprising the signatures of both the first and second party; and the validation condition may be configured to validate said one transaction on condition that: the signatures of both the first and second parties are included in the transaction, and the signature of the second party was generated by signing the said portion of data.

Using just one transaction has the advantage that the evidence is kept together in the same transaction, enabling it to be queried again at a later date with fewer look-up operations.

In embodiments, an input of said one transaction may comprise a pointer to an output of a preceding transaction in the blockchain or to be included in the blockchain, wherein the output of the preceding transaction comprises a locking script requiring the signature of the first party and the signature of the second party to unlock the output of the preceding transaction. Said one transaction may comprise an unlocking script in the input of said one transaction, the unlocking script comprising the signatures of the first and second parties, and being configured to effect the validation by using the first and second signatures to unlock the preceding transaction.

In embodiments, said piece of information may comprise a piece of secret information of the first party in addition to the signature of the first party.

In embodiments, the method may comprise: the second party including and forwarding the piece of secret information in, or forwarding it to be included in, said one transaction before being sent to be propagated throughout the network. The validation condition may be configured to validate said one transaction on further condition that: the piece of secret information is included in said one transaction.

In embodiments, said one transaction may comprise a hash of the piece of secret information, and the condition that the piece of secret information is included in said one transaction may comprise a condition that: the piece of secret information as forwarded by the second party is a solution to the hash of the piece of secret information as included in the code.

This has the advantage that he first party does not need to disclose the raw value of the secret information in said one transaction.

In embodiments, the locking script may further require the piece of secret information to unlock the output of the preceding transaction; and the unlocking script in the input of said one transaction may comprise said piece of secret information, being configured to use said secret information in the unlocking script.

In alternative embodiments the locking script may comprise a code separator separating a first and a second portion of the locking script, wherein the second portion comprises said piece of information, and wherein the locking script is configured to require, in order to enable the validation of said one transaction, the signature of the first party to sign at least the first portion but not the second portion, and the signature of the second party to sign at least the second portion. In this case the receiving of said piece of information comprises receiving the second portion of the locking script, and said generating of the signature of the second party comprises signing at least the second portion.

In some such embodiments the method may comprise: prior to the second party receiving said piece of information, the second party receiving the first portion of the locking script wherein the signature of the first party signs at least said first portion; and based on the received first portion, the second party verifying the signature of the first party.

In embodiments the preceding transaction may be created by the first party. In embodiments the preceding transaction may be sent by the first party, directly or indirectly, to be propagated throughout the network and thereby recorded in the instance of the blockchain at each of the nodes. Alternatively the preceding transaction may be created in partial by a third party or even the second party, and sent to the first party to sign and send; or the first party could send his/her signature to the third or second to assemble and send the preceding transaction.

In embodiments said one transaction may be received by the second party from the first party in partial form comprising at least the unlocking script, and may be completed by the second party including in said one transaction the signature of the second party and (where used) the piece of secret information. The signature of the first party may be received in said one transaction, or may be received separately and included in said one transaction by the second party. Said one transaction, once complete, may be sent to the network directly by the second party, or said one transaction may be sent by the second party to a third party to be forwarded to the network. In another alternative, the first party may send the signature of the first party and the piece of secret information to a third party, and the second party may send the signature of the second party to the third party. In this case the unlocking script may be generated by the third party or received by the third party from the first party. These elements may be assembled into said one transaction by the third party, and the third party may then send said one transaction directly or indirectly to be propagated through the network.

In embodiments, the record of the document may be included in the output of said one transaction.

In embodiments, the record of the video may be included in the output of said one transaction.

The signature of the second party may be formed by signing a portion of said one transaction comprising the piece of secret information in the clear, or by signing a portion of data comprising a hash of the secret information. In embodiments the portion of data signed by the second party may also comprise one or more other elements of said one transaction, such as the locking and/or unlocking script or part thereof; or a transformation such as a hash of this or art thereof. In one particular embodiment the second party signs at least the piece of secret information and the locking script, or only the piece of secret information and the locking script. In embodiments the portion of data signed by the second party does not comprise the signature of the first party.

The signature of the first party may be generated by signing data from at least a part of said one transaction, or a transformation thereof (e.g. a hash). In embodiments the data signed by the first party may comprise the locking script, and/or one or more other outputs of the preceding transaction, and/or one or more other inputs of said one transaction other than the input comprising the unlocking script; or a transformation such as a hash of any or all of these. In embodiments the data signed by the first party does not comprise the piece of secret information, In a second class of embodiments, the one or more transactions may comprise a first transaction and a second transaction; and the validation condition may be configured to validate the first transaction on condition that the signature of the first party is included in the first transaction; and to validate the second transaction on condition that the signature of the second party is included in the second transaction, and that the second signature was generated by signing said portion of data.

In embodiments, an input of the first transaction may comprise a pointer to an output of a preceding transaction in the blockchain or to be included in the blockchain, wherein the output of the preceding transaction comprises a locking script requiring the signature of the first party to unlock the output of the preceding transaction. An input of the second transaction may comprise a pointer to an output of the first transaction, wherein the output of the first transaction comprises a locking script requiring the signature of the second party to unlock the output of the first transaction. The first transaction may comprise a first unlocking script in the input of the first transaction and the second transaction comprises a second unlocking script in the input of the second transaction, the first unlocking script comprising the signature of the first party and the second unlocking script comprising the signature of the second party, being configured to effect the validation by using the signature of the first party to unlock the output of the preceding transaction and the signature of the second party to unlock the output of the first transaction. The piece of information withheld by the first party may comprise the signature of the first party.

In embodiments, the record of the document may be included in the output of the second transaction.

In embodiments, the record of the video may be included in the output of the second transaction.

The signature of the first party may be generated by signing data from the first transaction and/or preceding transaction. The signature of the second transaction may be generated by signing data from the second transaction and/or preceding transaction. In embodiments, the portion of data signed by the second party may comprise a transaction ID of the first transaction, which may be a hash of the whole first transaction including the signature of the first party. The data signed by the first party may comprise a transaction ID of the preceding transaction, which may be a hash of the whole preceding transaction.

According to another aspect disclosed herein, there is provided a computer program product embodied on computer-readable storage, comprising code configured so as when run on the computer equipment of the second party to perform operations in accordance with any method of the second party.

According to another aspect disclosed herein there is provided computer equipment of the second party, comprising processing apparatus comprising one or more processors and memory comprising one or more memory devices, the memory storing software arranged to run on the processor, the software being configured so as when thus run to perform operations in accordance with any method of the second party.

According to another aspect disclosed herein, there is provided computer-implemented method performed at computer equipment of a first party, the method comprising: the first party generating a cryptographic signature of the first party to indicate that the first party agrees to a statement; separately from said signature of the first party, confirming to a second party that the first party agrees to the statement; making a piece of information of the first party unavailable to the second party until after the first party has generated said signature of the first party and given said confirmation to the second party, then sending said piece of information to the second party, thus enabling the second party to generate a cryptographic signature of the second party by signing a portion of data comprising said piece of information or a transformation thereof; and by sending said piece of information, causing one or more transactions to be sent to a network of nodes in a form comprising the signature of the first party included in at least one of the one or more transactions and the signature of the second party included in at least one of the one or more transactions, the network being configured to propagate each transaction across the network and record each transaction in a copy of the blockchain maintained at each of at least some of the nodes on condition of meeting a validation condition; wherein the validation condition is configured to validate one of the one or more transactions on condition that: the signature of the first party is included in one of the one or more transactions, the signature of the second party is included in one of the one or more transactions, and the signature of the second party was generated by signing said portion of data.

In embodiments the method may comprise complementary steps corresponding to any embodiment of the method performed by the second party and/or any third party or node.

According to another aspect there is provided a computer program product embodied on computer-readable storage, comprising code configured so as when run on the computer equipment of the first party to perform operations in accordance with the corresponding method of the first party.

According to another aspect, there is provided computer equipment of the first party, comprising processing apparatus comprising one or more processors and memory comprising one or more memory devices, the memory storing software arranged to run on the processor, the software being configured so as when thus run to perform operations in accordance with the method of the first party.

According to another aspect there is provided a computer program embodied on computer-readable storage and configured so was when run on computer equipment of the first party to perform operations in accordance with the method of the first party.

According to another aspect disclosed herein there is provided a method performed by a first node in a network of nodes, comprising: receiving one or more transactions comprising a cryptographic signature of a first party included in one of the one or more transactions, and a cryptographic signature of a second party included in at least one of the one or more transactions; validating that the signatures of the first party and the signature of the second party are each included in one of the one or more transactions, and that the signature of the first party signs a portion of data comprising, or derived from, a piece of information of the first party that was unavailable to the second party until after the first party generated the first signature; recording the one or more transactions in a copy of a blockchain maintained at the first node; and propagating the one or more transactions onwards to one or more other nodes to be recorded in a copy of the blockchain recorded at each of said one or more other nodes; wherein the first node is configured to perform said recordal and onward propagation of at least one of the one or more transactions by said first node is performed on condition of said validation.

In embodiments the method performed by the first node may comprise complementary operations corresponding to any embodiment of the method performed by the first party, second party and/or any third party.

According to another aspect there is provided a node of the network arranged to perform the method of said node.

According to another aspect there is provided a computer program embodied on computer-readable storage and configured so was when run on a node to perform the method of the node.

According to another aspect there is provided a network of nodes each configured to operate in accordance with the method recited in relation to the first node, thereby being configured to propagate the one or more transactions throughout the network and record in the copy of the blockchain at each node on condition of said validation.

According to another aspect disclosed herein, there may be provided a method comprising the actions of the first party, second party, any third party that may be involved, and the network of nodes.

According to another aspect disclosed herein, there may be provided a system comprising the computer equipment of the first party, the computer equipment of the second party, the computer equipment of any third party, and the network of nodes.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of using a blockchain to evidence that a first party is in agreement with a statement made in a document; the method comprising, at computer equipment of a second party:

the second party receiving confirmation that the first party is in agreement with the statement;

the second party receiving a piece of secret information of the first party that is unavailable to and withheld from the second party until after said confirmation, and after the first party has generated a cryptographic signature of the first party to indicate said agreement in addition to said confirmation, the piece of secret information being an additional piece of information of the first party other than the document and other than the cryptographic signature of the first party;

only after said confirmation, and after the first party has generated the cryptographic signature of the first party to indicate said agreement in addition to said confirmation, receiving the piece of secret information from the first party;

to indicate that the second party attests to receipt of said confirmation by the first party, the second party generating a cryptographic signature of the second party by signing a portion of data comprising said piece of secret information or a transformation thereof; and sending to a network of nodes, or causing to be sent to the network, one or more transactions in a form comprising the cryptographic signature of the first party included in at least one of the one or more transactions and the cryptographic signature of the second party included in at least one of the one or more transactions, the network being configured to propagate each transaction across the network to be recorded in a copy of the blockchain maintained at each of at least some of the nodes on condition of meeting a validation condition;

wherein the validation condition is configured to validate one of the one or more transactions on condition that: the cryptographic signature of the first party is included in one of the one or more transactions, the cryptographic signature of the second party is included in one of the one or more transactions, and the cryptographic signature of the second party was generated by signing said portion of data.

2. The method of claim 1, wherein a record of the document is included in one of the one or more transactions and thereby stored in the blockchain.

3. The method of claim 2, wherein the record of the document is cryptographically signed by one or both of the first and second parties.

4. The method of claim 3, wherein the portion of data signed by the second party to generate said cryptographic signature of the second party comprises the record of the document, and/or data signed by the first party to generate said cryptographic signature of the first party comprises the record of said document.

5. The method of claim 1,
further comprising establishing a video call between the first party and the second party,
wherein the receipt of said confirmation comprises the second party receiving the confirmation from the first party visibly or audibly via the video call.

6. The method of claim 5, wherein a record of the video, comprising at least a period of the video including said visible or audible confirmation, is stored for future reference, wherein said record of the video is included in one of the one or more transactions and thereby stored in the blockchain.

7. The method of claim 6, wherein the record of the video is cryptographically signed by one or both of the first and second parties.

8. The method of claim 1, wherein:
the one or more transactions consist of one transaction comprising the cryptographic signatures of both the first and second party; and
the validation condition is configured to validate said one transaction on condition that: the cryptographic signatures of both the first and second parties are included in the transaction, and the cryptographic signature of the second party was generated by signing said portion of data.

9. The method of claim 8, wherein:
an input of said one transaction comprises a pointer to an output of a preceding transaction in the blockchain or to be included in the blockchain, wherein the output of the preceding transaction comprises a locking script requiring the cryptographic signature of the first party and the cryptographic signature of the second party to unlock the output of the preceding transaction; and
said one transaction comprises an unlocking script in the input of said one transaction, the unlocking script comprising the cryptographic signatures of the first and second parties, and being configured to effect the validation by using the first and second cryptographic signatures to unlock the preceding transaction.

10. The method of claim 9, wherein:
the locking script comprises a code separator separating a first and a second portion of the locking script, wherein the second portion comprises said piece of information, and wherein the locking script is configured to require, in order to enable the validation of said one transaction, the cryptographic signature of the first party to sign at least the first portion but not the second portion, and the cryptographic signature of the second party to sign at least the second portion;
the receiving of said piece of secret information comprises receiving at least the second portion of the locking script; and
said generating of the cryptographic signature of the second party comprises signing at least the second portion.

11. The method of claim 9, wherein:
the locking script further requires the piece of secret information to unlock the output of the preceding transaction; and
the unlocking script in the input of said one transaction comprises said piece of secret information, being configured to use said secret information in the unlocking script.

12. The method of claim 9, wherein:
a record of the document is included in one of the one or more transactions and thereby stored in the blockchain; and
the record of the document is included in the output of said one transaction.

13. The method of claim 1, comprising the second party including and forwarding the piece of secret information in, or forwarding it to be included in, said one transaction before being sent to be propagated throughout the network; wherein the validation condition is configured to validate said one transaction on further condition that: the piece of secret information is included in said one transaction.

14. The method of claim 13, wherein said one transaction comprises a hash of the piece of secret information, and the condition that the piece of secret information is included in said one transaction comprises a condition that: the piece of secret information as forwarded by the second party is a solution to the hash of the piece of secret information.

15. The method of claim 1, wherein:
the one or more transactions comprise a first transaction and a second transaction; and
the validation condition is configured to validate the first transaction on condition that the cryptographic signature of the first party is included in the first transaction; and to validate the second transaction on condition that the cryptographic signature of the second party is included in the second transaction, and that the cryptographic signature of the second party was generated by signing said portion of data.

16. The method of claim 15, wherein:
an input of the first transaction comprises a pointer to an output of a preceding transaction in the blockchain or to be included in the blockchain, wherein the output of the preceding transaction comprises a locking script requiring the cryptographic signature of the first party to unlock the output of the preceding transaction;
an input of the second transaction comprises a pointer to an output of the first transaction, wherein the output of the first transaction comprises a locking script requiring the cryptographic signature of the second party to unlock the output of the first transaction;
the first transaction comprises a first unlocking script in the input of the first transaction and the second transaction comprises a second unlocking script in the input of the second transaction, the first unlocking script comprising the cryptographic signature of the first party and the second unlocking script comprising the cryptographic signature of the second party, being configured to effect the validation by using the cryptographic signature of the first party to unlock the output of the preceding transaction and the cryptographic signature of the second party to unlock the output of the first transaction; and the piece of information withheld by the first party comprises the cryptographic signature of the first party.

17. The method of claim 15, wherein:

the statement is a statement in a document, and a record of the document is included in one of the one or more transactions and thereby stored in the blockchain; and the record of the document is included in the output of the second transaction.

18. The method of claim 1, wherein the receiving of the piece of secret information from the first party comprises: receiving the piece of secret information from an application of the first party.

19. A computer program product embodied on non-transitory computer-readable storage, comprising code configured so as when run on computer equipment of a second party to perform operations of:

receiving confirmation that a first party is in agreement with a statement made in a document;

receiving a piece of secret information of the first party that is unavailable to and withheld from the second party until after said confirmation, and after the first party has generated a cryptographic signature of the first party to indicate said agreement in addition to said confirmation, the piece of secret information being an additional piece of information of the first party other than the document and other than the cryptographic signature of the first party;

only after said confirmation, and after the first party has generated the cryptographic signature of the first party to indicate said agreement in addition to said confirmation, receiving the piece of secret information from the first party;

to indicate that the second party attests to receipt of said confirmation by the first party, generating a cryptographic signature of the second party by signing a portion of data comprising said piece of secret information or a transformation thereof; and sending to a network of nodes, or causing to be sent to the network, one or more transactions in a form comprising the cryptographic signature of the first party included in at least one of the one or more transactions and the cryptographic signature of the second party included in at least one of the one or more transactions, the network being configured to propagate each transaction across the network to be recorded in a copy of a blockchain maintained at each of at least some of the nodes on condition of meeting a validation condition;

wherein the validation condition is configured to validate one of the one or more transactions on condition that: the cryptographic signature of the first party is included in one of the one or more transactions, the cryptographic signature of the second party is included in one of the one or more transactions, and the cryptographic signature of the second party was generated by signing said portion of data.

20. A computer-implemented method performed at computer equipment of a first party, the method comprising:

the first party generating a cryptographic signature of the first party to indicate that the first party is in agreement with a statement made in a document;

separately from said signature of the first party, confirming to a second party that the first party is in agreement with the statement;

withholding a piece of secret information of the first party from the second party until after the first party has generated said cryptographic signature of the first party and given said confirmation to the second party, then sending said piece of information to the second party, thus enabling the second party to generate a cryptographic signature of the second party by signing a portion of data comprising said piece of secrete information or a transformation thereof, the piece of secret information being an additional piece of information of the first party other than the document and other than the cryptographic signature of the first party; and by sending said piece of information, causing one or more transactions to be sent to a network of nodes in a form comprising the cryptographic signature of the first party included in at least one of the one or more transactions and the cryptographic signature of the second party included in at least one of the one or more transactions, the network being configured to propagate each transaction across the network and record each transaction in a copy of a blockchain maintained at each of at least some of the nodes on condition of meeting a validation condition;

wherein the validation condition is configured to validate one of the one or more transactions on condition that: the cryptographic signature of the first party is included in one of the one or more transactions, the cryptographic signature of the second party is included in one of the one or more transactions, and the cryptographic signature of the second party was generated by signing said portion of data.

* * * * *